United States Patent
Ho et al.

(10) Patent No.: US 9,100,179 B2
(45) Date of Patent: Aug. 4, 2015

(54) METHOD AND APPARATUS FOR MANAGING A NEW DATA INDICATOR IN A WIRELESS COMMUNICATION SYSTEM

(75) Inventors: Sai Yiu Duncan Ho, San Diego, CA (US); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 1267 days.

(21) Appl. No.: 12/555,709

(22) Filed: Sep. 8, 2009

(65) Prior Publication Data

US 2010/0067468 A1     Mar. 18, 2010

Related U.S. Application Data

(60) Provisional application No. 61/095,676, filed on Sep. 10, 2008.

(51) Int. Cl.
  *H04W 72/04*     (2009.01)
  *H04L 1/18*       (2006.01)

(52) U.S. Cl.
  CPC .................... *H04L 1/1812* (2013.01)

(58) Field of Classification Search
  CPC .... H04L 1/1887; H04L 1/1812; H04L 1/1854
  USPC .................. 370/310, 328, 329, 335
  See application file for complete search history.

(56) References Cited

U.S. PATENT DOCUMENTS 6,901,063 B2 *   5/2005   Vayanos et al. ............... 370/335
7,525,944 B2 *   4/2009   Vayanos et al. ............... 370/342

(Continued)

FOREIGN PATENT DOCUMENTS

CN         1864361 A      11/2006
CN       101040557 A       9/2007

(Continued)

OTHER PUBLICATIONS

Ericsson: "Handling of Semi-persistent Assignments and Grants" 3GPP Draft; R2-084758 Handling of Semi-Persistent Assignments and Grants, 3rd Generation Partnership Project (3GPP), Mobile Competence Centre ; 650, Route Des Lucioles ; F-06921 Sophia-Antipolis Cedex ; France, no. Jeju; Sep. 1, 2008, XP050319718.

(Continued)

*Primary Examiner* — Chi M Pham
*Assistant Examiner* — Robert Lopata
(74) *Attorney, Agent, or Firm* — Nerrie M. Zohn

(57) ABSTRACT

Systems and methodologies are described herein that facilitate techniques for managing respective original transmissions and re-transmissions of information within a wireless communication system. Various mechanisms are described herein for processing a new data indicator (NDI) associated with respective transmissions conducted for one or more Hybrid Automatic Repeat Request (HARQ) processes. For example, for a HARQ process shared between distinct scheduling schemes, an NDI associated with a latter transmission can be regarded as toggled irrespective of the value of the NDI upon recognizing that a utilized scheduling scheme (e.g., as indicated via a radio network temporary identifier (RNTI) or the like) has changed between successive transmissions (e.g., from semi-persistent scheduling to dynamic scheduling), thereby allowing processing of the latter transmission as a transmission of new data. As additionally described herein, various techniques are described herein for NDI processing in the case of uplink grant and downlink assignment transmission.

22 Claims, 13 Drawing Sheets

(56) References Cited

U.S. PATENT DOCUMENTS

| | | | |
|---|---|---|---|
| 7,657,815 B2 * | 2/2010 | Seidel et al. | 714/748 |
| 7,961,680 B2 * | 6/2011 | Park et al. | 370/329 |
| 2007/0259665 A1 * | 11/2007 | Chiu et al. | 455/436 |
| 2008/0170528 A1 * | 7/2008 | Bosch et al. | 370/312 |
| 2008/0212541 A1 * | 9/2008 | Vayanos et al. | 370/335 |
| 2009/0034466 A1 * | 2/2009 | Lindskog et al. | 370/329 |
| 2011/0044243 A1 * | 2/2011 | Yi et al. | 370/328 |
| 2011/0182245 A1 * | 7/2011 | Malkamaki et al. | 370/329 |

FOREIGN PATENT DOCUMENTS

| | | |
|---|---|---|
| CN | 101155013 A | 4/2008 |
| RU | 2305372 C2 | 8/2007 |
| WO | 2007027052 A1 | 3/2007 |
| WO | 2007052719 A1 | 5/2007 |
| WO | WO2008081222 A1 | 7/2008 |
| WO | WO-2009115904 A2 | 9/2009 |
| WO | 2010002130 A2 | 1/2010 |

OTHER PUBLICATIONS

International Search Report and Written Opinion—PCT/US2009/056547—ISA/EPO—Jan. 29, 2010.

Panasonic : "RAN1/2 specification alignment on HARQ operation" 3GPP Draft; R1-082987, 3RD Generation Partnership Project (3GPP), Mobile Competence Centre ; 650, Route Des Lucioles ; F-06921 Sophia-Antipolis Cedex ; France, no. Jeju; Aug. 12, 2008, XP050316450.

Panasonic: "Remaining issues on Persistent scheduling" 3GPP Draft; R2-084098_Remaining_Issuess_on_Persistent_SCheduling, 3rd Generation Partnership Project (3GPP), Mobile Competence Centre ; 650, Route Des Lucioles ; F-06921 Sophia-Antipolis Cedex ; France, no. Jeju; Aug. 12, 2008, XP050319245.

QUALCOMM Europe: "NDI and Message 3" 3GPP Draft; R2-084156 NDI and MSG3, 3rd Generation Partnership Project (3GPP), Mobile Competence Centre ; 650, Route Des Lucioles ; F-06921 Sophia-Antipolis Cedex ; France, no. Jeju; Aug. 12, 2008, XP050319292.

QUALCOMM Europe: "Removal of interpretation of NDI information in 36.213" 3GPP Draft; R1-083240 NDI Handling, 3rd Generation Partnership Project (3GPP), Mobile Competence Centre ; 650, Route Des Lucioles ; F-06921 Sophia-Antipolis Cedex; France, no. Jeju; Aug. 12, 2008, XP050316652.

Alcatel-Lucent, Alcatel Shanghai Bell: "Semi-persistent Scheduling open issues", R2-084182, 3GPP TSG-RAN WG2 #63, Aug. 18, 2008.

Ericsson: "Open issues in Semi Persistent Scheduling", R2-085397, 3GPP TSG-RAN WG2 #63bis, Sep. 29, 2008.

Taiwan Search Report—TW098130630—TIPO—Oct. 1, 2012.

* cited by examiner

METHOD AND APPARATUS FOR MANAGING A NEW DATA INDICATOR IN A WIRELESS COMMUNICATION SYSTEM

CROSS-REFERENCE

This application claims the benefit of U.S. Provisional Application Ser. No. 61/095,676, filed Sep. 10, 2008, and entitled "NDI HANDLING WITH HARQ PROCESS SHARING FOR SEMI-PERSISTENT AND DYNAMIC SCHEDULING," the entirety of which is incorporated herein by reference.

BACKGROUND

I. Field

The present disclosure relates generally to wireless communications, and more specifically to techniques for managing respective new transmissions and re-transmissions in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

To improve the accuracy of information transmitted within a wireless communication system, various techniques for re-transmitting information between communicating entities can be utilized in the event that an initial transmission of the information is unsuccessful. These techniques can include, for example, Automatic Repeat Request (ARQ), Hybrid ARQ (HARQ), or the like. With regard to HARQ operation, information can be communicated to and/or from various network entities according to one or more distinct HARQ processes. Further, a given HARQ process can be shared among multiple types of scheduling such as, for example, dynamic scheduling, semi-persistent scheduling, or the like.

Conventionally, a HARQ process can be associated with a new data indicator (NDI), which can be utilized by a receiver to determine whether a given transmission is a new transmission or a repeat transmission. However, in the event that respective scheduling types shared for a given HARQ process configure the NDI in different manners, determining whether a given transmission is a new transmission or a repeat transmission can cause a receiver associated with the HARQ process to incur significant processing load, memory overhead, and/or other costs in cases where the respective scheduling types are utilized successively in connection with the HARQ process. Accordingly, it would be desirable to implement techniques for managing communications associated with a HARQ process that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying information relating to an initial transmission for a Hybrid Automatic Repeat Request (HARQ) process, the information comprising scheduling information and an initial new data indicator (NDI); identifying information relating to a subsequent transmission for the HARQ process, the information comprising scheduling information and a subsequent NDI; and processing the subsequent NDI as toggled from the initial NDI irrespective of a value of the subsequent NDI upon determining that the scheduling information changed between the initial transmission and the subsequent transmission for the HARQ process.

A second aspect described herein relates to a wireless communications apparatus, which can comprise a memory that stores data relating to a HARQ process, a first transmission and a second transmission for the HARQ process, and a NDI. The wireless communications apparatus can further comprise a processor configured to identify a scheduling format utilized for the first transmission and the second transmission for the HARQ process and to process the NDI as toggled between the first transmission and the second transmission irrespective of a value of the NDI upon determining that a scheduling format utilized for the first transmission and a scheduling format utilized for the second transmission differ.

A third aspect relates to an apparatus, which can comprise means for identifying a first radio network temporary identifier (RNTI) associated with a first transmission for a HARQ process; means for identifying a second RNTI, disparate from the first RNTI, associated with a second transmission for the HARQ process that occurs subsequent to the first transmission; and means for processing a NDI associated with the second transmission as toggled regardless of a value of the NDI.

A fourth aspect described herein relates to a computer program product, which can include a computer-readable medium that comprises code for causing a computer to identify a first RNTI used for a first transmission associated with a HARQ process; code for causing a computer to identify a second RNTI, disparate from the first RNTI, used for a second transmission associated with the HARQ process that occurs subsequent to the first transmission; and code for causing a computer to process a NDI associated with the second transmission as toggled regardless of a value of the NDI.

A fifth aspect described herein relates to a method operable in a wireless communication system, which can comprise identifying at least one of a cell RNTI (C-RNTI), a semi-persistent scheduling (SPS) C-RNTI, or a temporary C-RNTI to be utilized at a given transmission time interval (TTI) in association with a HARQ process; identifying an uplink grant for the given TTI received on a Physical Downlink Control Channel (PDCCH) for the C-RNTI or temporary C-RNTI or an uplink grant for the given TTI received in a Random Access Response; and considering a NDI associated with the uplink grant to have been toggled regardless of a value of the NDI upon determining that the uplink grant is for the C-RNTI and either an uplink grant has been received for the SPS C-RNTI or a configured uplink grant has occurred since a previous received uplink grant for the C-RNTI for the HARQ process.

A sixth aspect described herein relates to another method operable in a wireless communication system, which can comprise identifying at least one of a C-RNTI, a SPS C-RNTI, or a temporary C-RNTI to be utilized at a given TTI in association with a HARQ process; identifying a downlink assignment for the given TTI received on a PDCCH for the C-RNTI or temporary C-RNTI; and considering a NDI associated with the downlink assignment to have been toggled regardless of a value of the NDI upon determining that the downlink assignment is for the C-RNTI and either a downlink assignment has been received for the SPS C-RNTI or a configured downlink assignment has been indicated to an associated HARQ entity since a previous received downlink assignment for the C-RNTI for the HARQ process.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
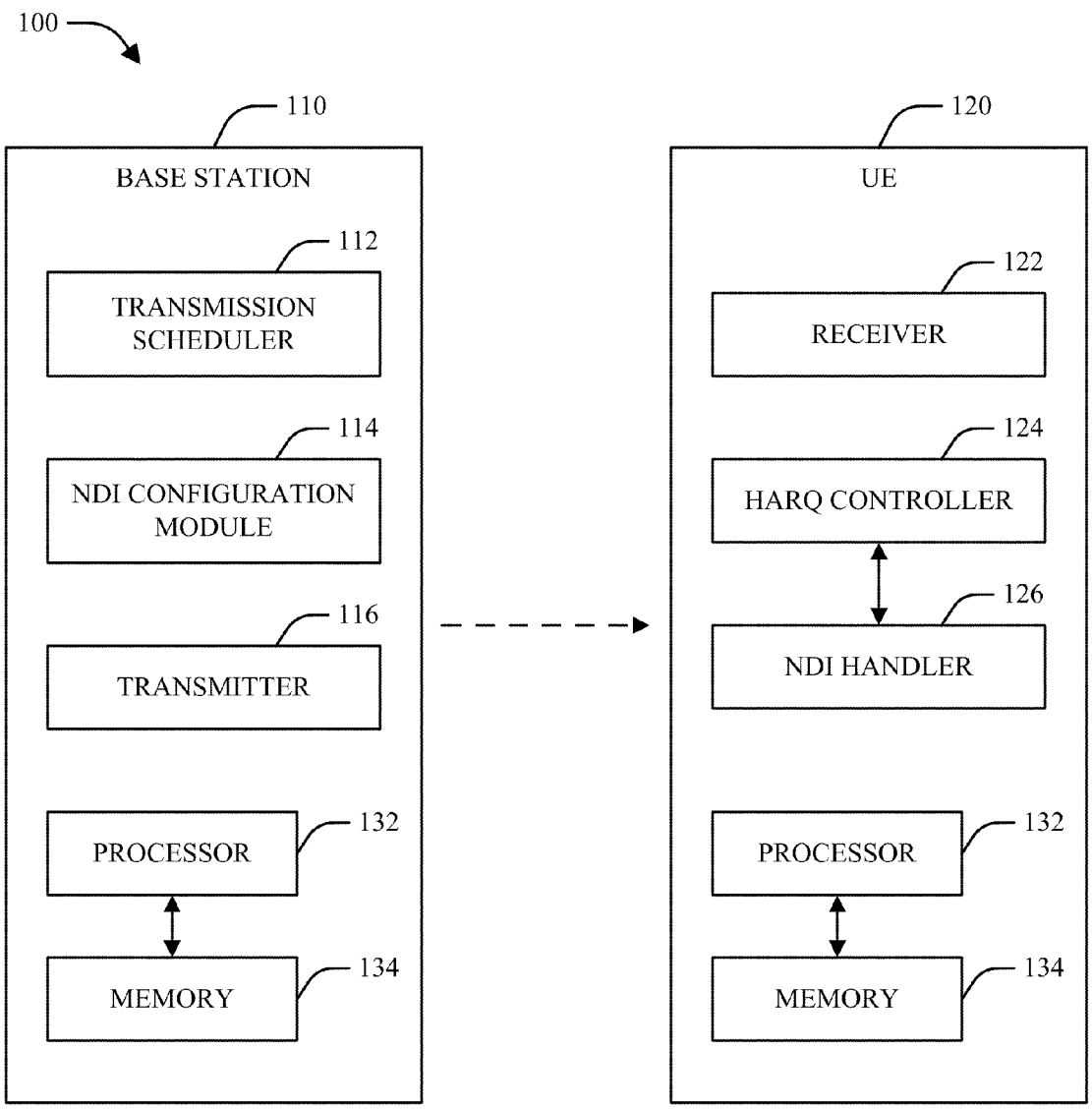
FIG. 1 is a block diagram of a system for managing respective transmissions and/or re-transmissions associated with a HARQ process in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for managing respective transmissions and/or re-transmissions associated with a HARQ process in accordance with various aspects described herein. As FIG. 1 illustrates, system 100 can include a base station (also referred to herein as a Node B, an Evolved Node B (eNB), an access point (AP), etc.) 110, which can communicate with one or more user equipment units (UEs, also referred to herein as access terminals (ATs), mobile terminals, etc.) 120. In one example, base station 110 can engage in one or more downlink (DL, also referred to as forward link (FL)) communications with UE 120, and UE 120 can engage in one or more uplink (UL, also referred to as reverse link (RL)) communications with base station 110. In another example, base station 110 can be associated with a wireless communication network, such as an Evolved UMTS (Universal Mobile Telecommunications System) Terrestrial Radio Access Network (E-UTRAN), or a portion thereof (e.g., a cell, sector, etc.). Further, base station 110 can operate in conjunction with one or more other network entities, such as a system controller (not shown) or the like, for coordinating communication between base station 110 and UE 120.

In accordance with one aspect, respective DL transmissions within system 100 can be conducted from base station 110 via a transmitter 116 to a UE 120 via a receiver 122. While not illustrated in system 100, it should be appreciated that respective UL transmissions could also occur from a transmitter at UE 120 to a receiver at base station 110. Further, while various aspects provided herein are described with respect to a DL transmission from base station 110 to UE 120, it should be appreciated that similar techniques could be utilized for UL transmissions and/or any other suitable transmissions within system 100. In one example, base station 110 and/or UE 120 can further include a processor 132 and/or memory 134, which can be utilized to implement some or all of the functionality described herein.

In one example, to improve overall system performance and the reliability of information communicated within system 100, base station 110 and/or UE 120 can utilize respective techniques for re-transmitting information in the event that such information is not successfully received at an intended receiving device. For example, Automatic Repeat Request (ARQ) transmission can be utilized, wherein a device receiving information (e.g., UE 120) can request re-transmission of various portions of the information in the event that an initial transmission is unsuccessful. Additionally or alternatively, Hybrid ARQ (HARQ) can be utilized, in which re-transmission requests as described above can be utilized in combination with one or more other techniques for error correction and/or other techniques for improving robustness of transmissions conducted within system 100. In one example, transmissions conducted within system 100 pursuant to HARQ can be performed in the context of one or more HARQ processes, which can be managed by a HARQ control 124 at UE 120 and/or similar mechanisms at base station 110 and/or any other suitable device(s) in system 100.

In accordance with one aspect, a new data indicator (NDI) can be utilized for respective HARQ processes in order to enable UE 120 and/or another suitable receiver to distinguish original transmissions of data from re-transmissions. For example, upon receiving a transmission corresponding to a HARQ process, a NDI handler 126 at UE 120 can identify a NDI provided within the transmission and determine whether the transmission corresponds to new data or re-transmitted data based on the NDI.

In accordance with another aspect, respective transmissions between base station 110 and UE 120 can be based on various forms of resource scheduling performed by base station 110 with respect to UE 120. For example, semi-persistent scheduling (SPS) can be utilized, wherein transmissions between base station 110 and UE 120 can occur on a predefined set of resources without requiring per-transmission resource allocation. Additionally or alternatively, dynamic scheduling can be utilized, wherein resources utilized for communication between base station 110 and UE 120 are dynamically configured on a per-transmission basis. In one example, a given HARQ process can be configured for sharing between multiple types of scheduling. Thus, for example, a given HARQ process can be shared for dynamic and semi-persistent scheduling.

Figure 2:
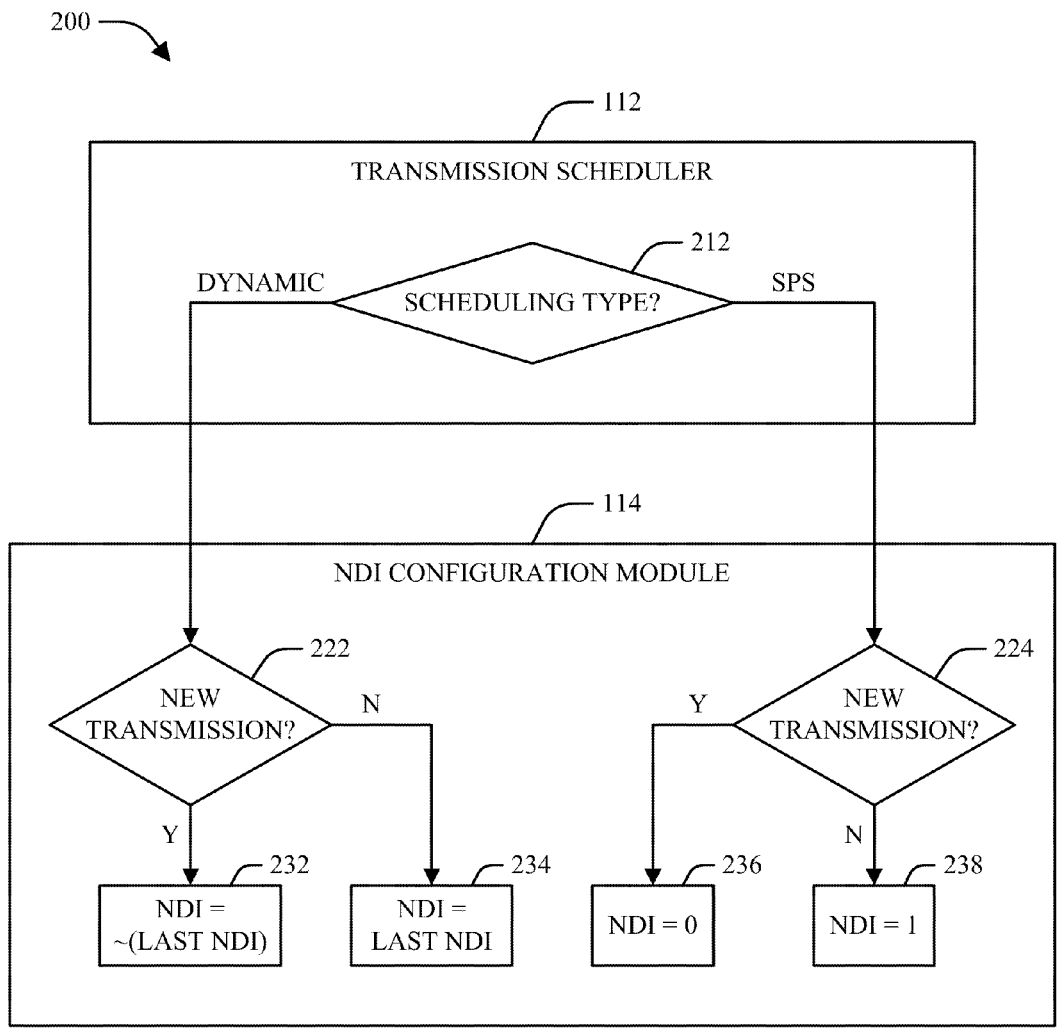
FIG. 2 is a block diagram of a system for configuring a new data indicator associated with a given transmission in accordance with various aspects.

In one example, in order for UE 120 to determine whether a re-transmission or a new transmission is occurring for a given HARQ process, an NDI indicative of either new data or a retransmission can be provided to HARQ controller 124 and/or NDI handler 126 at UE 120 for the UL and/or DL. In another example, depending on the type of scheduling utilized by base station 110, the corresponding NDI can be configured in various manners. This is shown in further detail by diagram 200 in FIG. 2. More particularly, as diagram 200 illustrates, transmission scheduler 112 can determine the type of scheduling to be utilized at decision block 212. Subsequently, NDI configuration module 114 can utilize the determination made at decision block 212 to configure NDI as shown in decision blocks 222-224. By way of example, if it is determined at decision block 212 that dynamic scheduling is utilized, decision block 222 at NDI configuration module 114 can facilitate toggling of an NDI bit upon a new data transmission. Thus, if new data is to be transmitted, an associated NDI bit can be toggled at block 232 relative to the last NDI indication. Otherwise, the associated NDI bit can remain unchanged from the previous indication as shown by block 234. For example, if an NDI bit is initially equal to 0, retransmissions can be indicated as long as the NDI bit remains equal to 0. Alternatively, a new transmission can be indicated by toggling the NDI bit to 1, after which retransmissions of the new transmission can be indicated until the NDI bit is again toggled to 0. By way of an alternate example, if it is determined at block 212 that SPS is utilized, an associated NDI can be set pursuant to decision block 224 such that a retransmission is indicated with NDI=1 (e.g., as shown at block 238) and a new transmission is indicated with NDI=0 (e.g., as shown at block 236).

Returning to system 100, it can be appreciated that, for a HARQ process shared for semi-persistent and dynamic scheduling, the distinct NDI handling techniques utilized for the respective scheduling mechanisms can result in increased complexity at UE 120. By way of example, base station 110 can conduct a first transmission at time t0 using SPS with NDI=0. Next, at time t1, base station 110 can schedule a SPS retransmission of the initial transmission and set NDI=1 to indicate the retransmission. At time t2, base station 110 can subsequently be configured to communicate a dynamic new transmission on the same HARQ process. However, as dynamic scheduling utilizes the NDI in a different manner than SPS, it can be appreciated that difficulties can be encountered by base station 110 in setting an NDI for various transmissions such as the transmission at time t2 appropriately and/or by UE 120 in processing the NDI.

For example, NDI configuration module 114 at base station 110 can operate at time t2 by toggling the NDI relative to the transmission at time t1 (e.g., setting NDI to 0). However, if UE 120 did not successfully receive the transmission at time t1, UE 120 in some cases may attempt to combine the SPS transmission at time t1 with a dynamic transmission at time t2, which is undesirable for various reasons as generally known in the art. Alternatively, UE 120 can be configured to compare a NDI associated with a dynamic transmission to a NDI of a previous dynamic transmission. However, it can be appreciated that this can result in additional memory, processing, and/or other overhead requirements on UE 120 in the event that one or more SPS transmissions have occurred between the dynamic transmissions.

In view of at least the above, HARQ controller 124 and/or NDI handler 126 at UE 120 can monitor for changes in scheduling utilized by base station 110. It can be appreciated that, upon changing a utilized scheduling mechanism from SPS to dynamic scheduling or vice versa, base station 110 will provide a new transmission as the first transmission following the scheduling change. Thus, in accordance with one aspect, after a given HARQ process identifier (ID) is used with a given scheduling scheme, NDI handler 126 can process a NDI associated with a subsequent transmission performed for a different scheduling scheme in a predefined manner (e.g., by regarding an associated transmission as a new transmission as opposed to a re-transmission) irrespective of the value of the NDI provided with the subsequent transmission.

Additionally and/or alternatively, SPS retransmissions can be handled with C-RNTI and indicate the appropriate HARQ process ID. In such an example, it can be appreciated that NDI processing is bypassed, as the HARQ process ID is in use for SPS, meaning that a transmission handled with C-RNTI is necessarily a retransmission.

Figure 3:
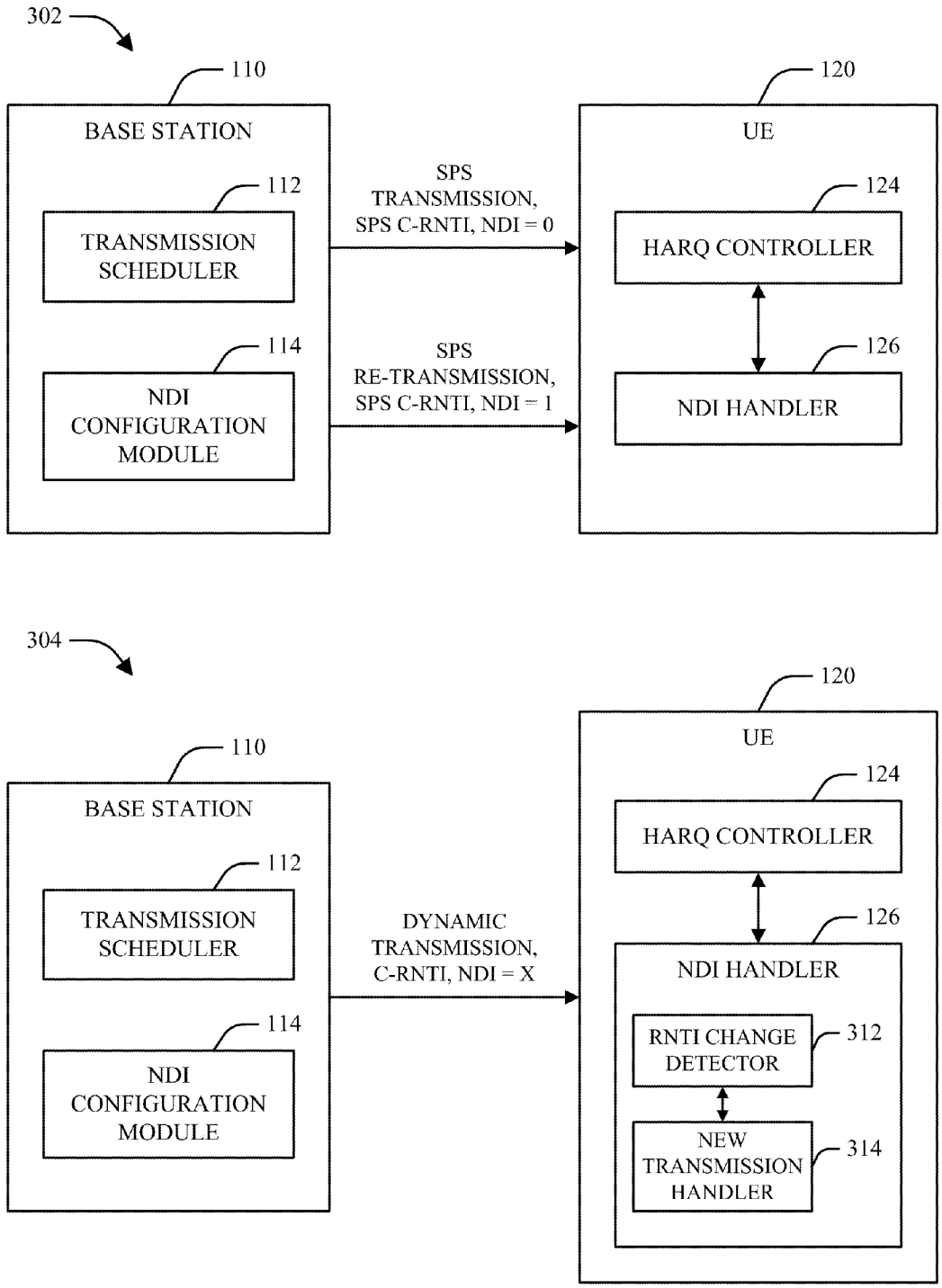
FIG. 3 illustrates an example technique for processing respective transmissions received from a wireless communication network in accordance with various aspects.

Turning to FIG. 3, respective diagrams 302-304 are provided that illustrate various aspects of the above described NDI configuration and processing in further detail. In accordance with one aspect, respective cell radio network temporary identifiers (C-RNTIs) can be utilized in association with a given HARQ process and can correspond to respective scheduling schemes utilized for respective transmissions. Thus, for example, a SPS C-RNTI can be utilized in association with SPS transmissions, and a distinct C-RNTI can be utilized in association with dynamic transmissions. It should be appreciated, however, that any other suitable C-RNTI(s) could be utilized for communication as illustrated by FIG. 3.

As generally described above and as illustrated by diagram 302, a transmission scheduler 112 and/or any other suitable components of base station 110 can be utilized to schedule a new SPS transmission to UE 120 at time t0. Such a transmission can be conducted on a SPS C-RNTI for the associated HARQ process, and can denote an initial NDI of 0 (e.g., as configured by NDI configuration module 114) to indicate that the transmission is a new transmission (e.g., as shown by system 200). Upon reception of the transmission at time t0, a HARQ controller 112 at UE 120 can identify that the SPS C-RNTI was utilized by base station 110, based upon which NDI handler 126 can read the NDI value associated with the transmission to determine that the transmission contains new data. As further described generally above and illustrated by diagram 304, base station 110 can subsequently conduct a re-transmission on the SPS C-RNTI at time t1 with NDI=1.

In accordance with one aspect, base station 110 can utilize both SPS and dynamic scheduling for a given HARQ process. Accordingly, as illustrated in diagram 304, base station 110 can provide a dynamic new transmission to UE 120 using C-RNTI at time t2 upon conducting the transmissions shown in diagram 304. However, as NDI configuration for dynamic scheduling can be based on toggling (e.g., as illustrated by system 200), base station 110 and/or UE 120 can encounter difficulty in properly configuring and/or reading an NDI associated with the transmission shown in diagram 304 for at least the reasons generally described above.

Thus, to mitigate these difficulties, NDI handler 126 at UE 120 can be configured (e.g., using a RNTI change detector and/or other suitable means) to determine whether a RNTI utilized for transmission by base station 110 has changed relative to a previous transmission. Upon determining that such a change has occurred, NDI handler 126 can in some cases regard the NDI associated with the transmission as having been toggled regardless of the provided value of the NDI. Thus, for example, after a given HARQ process ID is used with a given RNTI (e.g., SPS C-RNTI), NDI handler 126 can utilize a new transmission handler 314 and/or any other suitable means to regard a subsequent transmission performed for another RNTI (e.g., C-RNTI) as a new transmission irrespective of the NDI. As a result, it can be appreciated that any NDI value, e.g., NDI=X, can be transmitted when switching RNTI on a given HARQ process ID.

In general, it can be appreciated that a communication system as illustrated by diagrams 302-304 in FIG. 3 can operate as follows. Subsequent to conducting a transmission for X-RNTI, a re-transmission can be configured by base station 110 for scheduling only on the same RNTI. Accordingly, UE 120 can regard any transmissions conducted for Y-RNTI that occur after a transmission conducted for X-RNTI as a new transmission.

Figure 4:
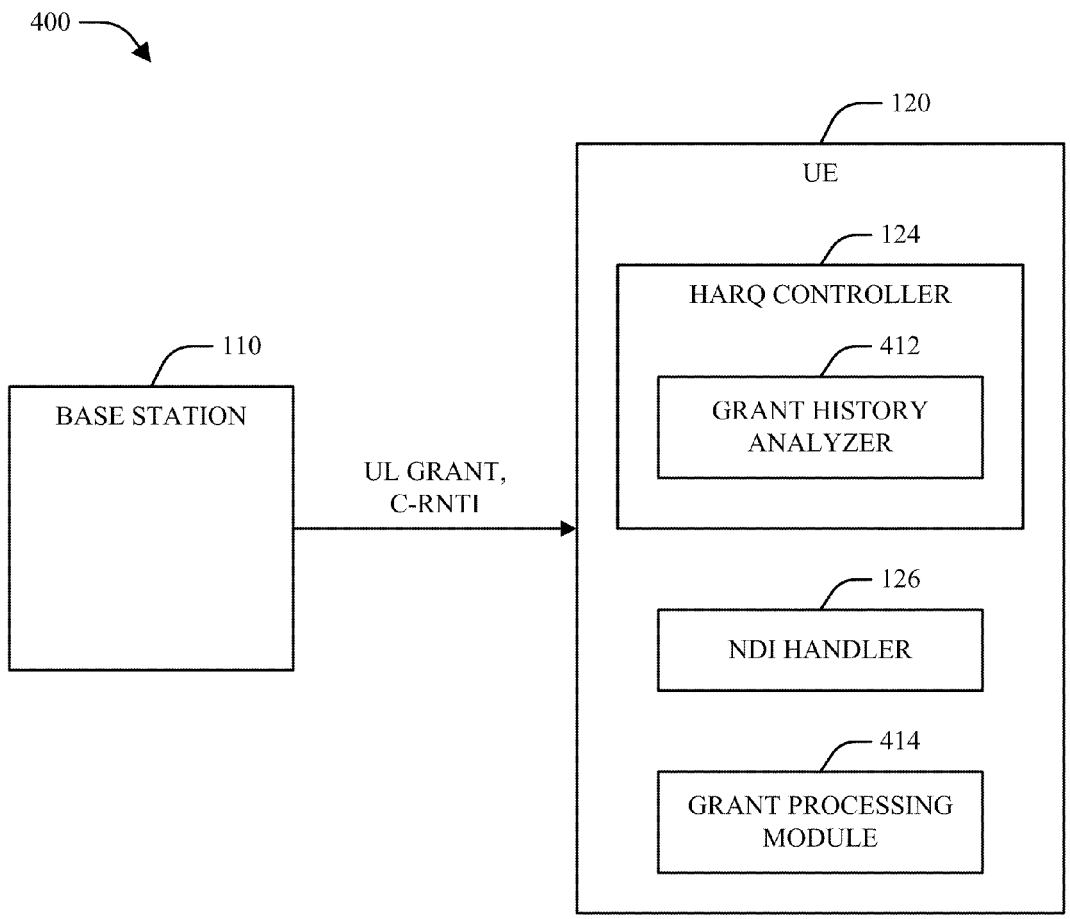
FIG. 4 is a block diagram of a system for processing uplink grant information in accordance with various aspects.

Referring next to FIG. 4, a system 400 for processing uplink grant or assignment information in accordance with various aspects is illustrated. In one example, system 400 can include a base station 110, which can transmit respective information, such as UL grants or the like, to UE 120. In another example, UL grant information and/or other similar information received by UE 120 can be processed by a grant processing module 414 and/or any other suitable mechanism(s) associated with UE 120.

By way of example, in order for UE 120 to transmit on an UL shared channel (UL-SCH) or the like, UE 120 can receive a corresponding UL grant, which can be received by UE 120 dynamically on a Physical Downlink Control Channel (PDCCH), in a Random Access Response, configured semi-persistently, or the like. In one example, in order to perform requested transmissions according to an UL grant, the MAC layer of UE 120 can receive respective HARQ information from various lower layer entities.

In accordance with one aspect, in the event that UE 120 has been configured to utilize a C-RNTI, a SPS C-RNTI, and/or a Temporary C-RNTI, a HARQ controller 124, NDI handler 126, and/or any other suitable mechanism(s) at UE 120 can be configured to process an UL grant for a given transmission time interval (TTI) in the following manner. In one example, if an UL grant for a given TTI is received by UE 120 on the PDCCH for the C-RNTI or Temporary C-RNTI of UE 120, or if an UL grant for the given TTI is received in a Random Access Response, a grant history analyzer 412 and/or other appropriate means associated with HARQ controller 124 can determine whether the grant is for the C-RNTI of UE 120. If so, and either an UL grant has previously been received for the SPS C-RNTI of UE 120 or a configured UL grant has occurred since the previous received UL grant for the C-RNTI of UE 120 corresponding to the same HARQ process, NDI handler can be configured to consider the NDI of the UL grant to have been toggled regardless of the value of the NDI.

Figure 5:
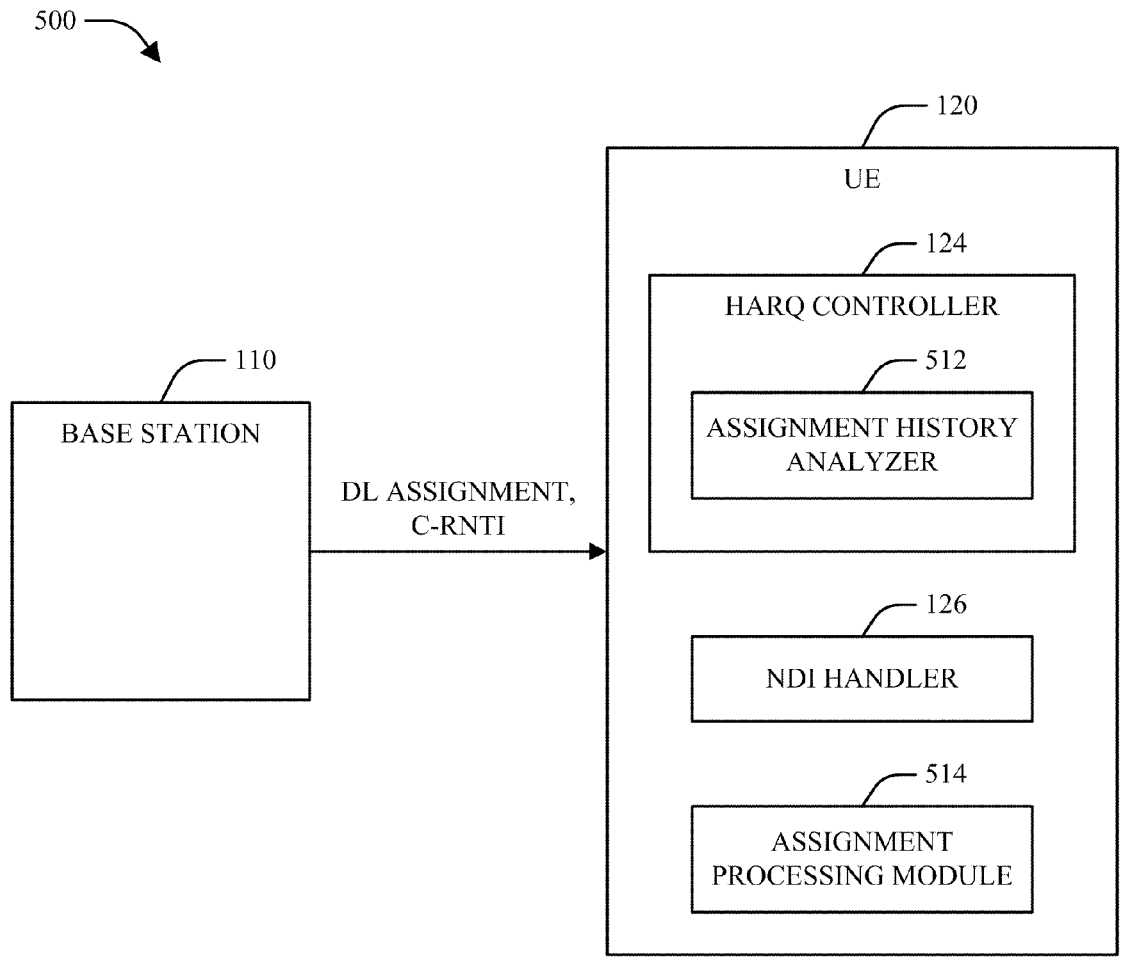
FIG. 5 is a block diagram of a system for processing downlink assignment information in accordance with various aspects.

In a similar manner to system 400, FIG. 5 illustrates a system 500 for processing DL assignment or grant information in accordance with various aspects. System 500 can include a base station 110, which can transmit DL assignments and/or other suitable information to a UE 120. In one example, DL assignment information and/or other similar information received by UE 120 can be processed by an assignment processing module 514 and/or any other suitable mechanism(s) associated with UE 120.

By way of example, respective assignments transmitted by base station 110 on the PDCCH can be utilized to indicate if there is a transmission on the DL shared channel (DL-SCH) and/or another suitable channel for UE 120. If such a transmission exists, a DL assignment can be further utilized to provide relevant HARQ information to UE 120. In accordance with one aspect, in the event that UE 120 has been configured to utilize a C-RNTI, a SPS C-RNTI, and/or a Temporary C-RNTI, a HARQ controller 124, NDI handler 126, and/or any other suitable mechanism(s) at UE 120 can be configured to process a DL assignment for respective TTIs during which UE 120 monitors PDCCH in the following manner. In one example, if a DL assignment for a given TTI is received by UE 120 on the PDCCH for the C-RNTI or Temporary C-RNTI of UE 120, an assignment history analyzer 512 and/or other appropriate means associated with HARQ controller 124 can determine whether the assignment is for the C-RNTI of UE 120. If so, and either a DL assignment has previously been received for the SPS C-RNTI of UE 120 or a configured DL assignment has been indicated to an associated HARQ entity since the previous received DL assignment for the C-RNTI of UE 120 corresponding to the same HARQ process, NDI handler can be configured to consider the NDI of the DL assignment to have been toggled regardless of the value of the NDI. In addition, upon determining that the conditions noted above have occurred, assignment processing module 514 and/or another suitable mechanism at UE 120 can indicate the presence of a DL assignment and deliver the associated HARQ information to the HARQ entity for the corresponding TTI.

Figure 6:
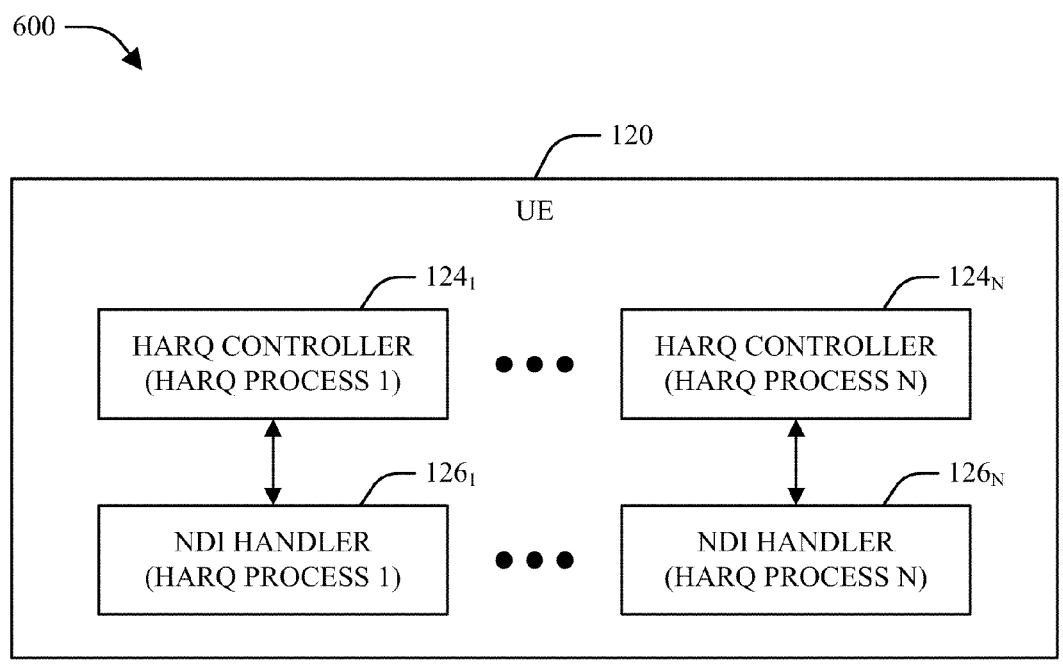
FIG. 6 is a block diagram of a system for managing transmissions associated with a plurality of HARQ processes in accordance with various aspects.

Turning next to FIG. 6, a block diagram of a system 600 for managing transmissions associated with a plurality of HARQ processes in accordance with various aspects is illustrated. As FIG. 6 illustrates, system 600 can include a UE 120, which can include one or more HARQ controllers 124 and/or NDI handlers 126. In one example, respective HARQ controllers 124 and NDI handlers can correspond to respective HARQ processes that can be managed concurrently by UE 120. As illustrated by system 600, respective sets of HARQ controllers 124 and NDI handlers 126 can be provided on a process-by-process basis. Alternatively, respective HARQ controllers 124 and/or NDI handlers 126 can be utilized with respect to respective sets of HARQ processes that can be uniform or non-uniform as well as overlapping or non-overlapping. In accordance with one aspect, system 600 can be utilized to support any suitable number of HARQ processes (e.g., 1, 2, 4, 8, . . . ).

Figure 7:
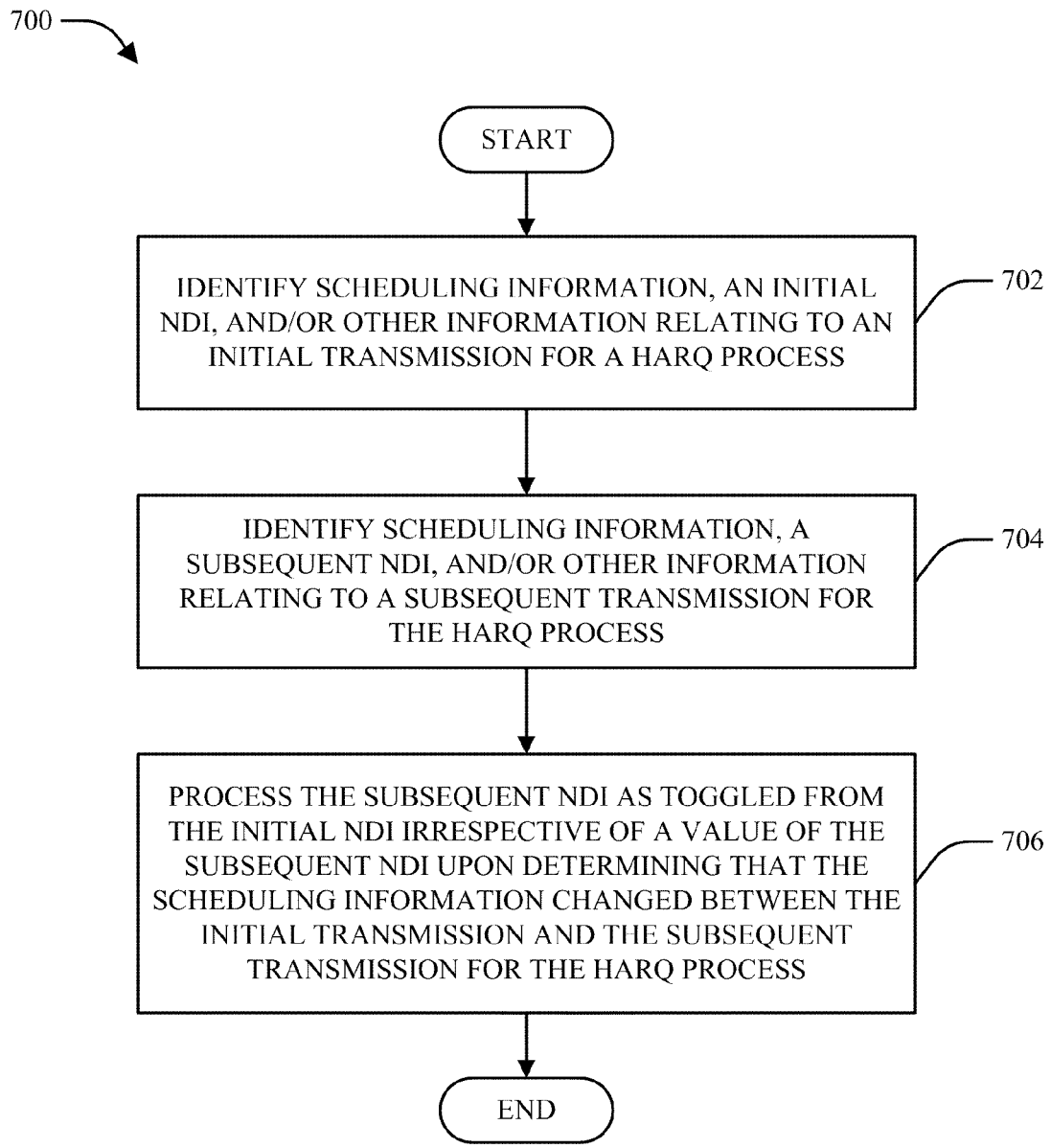
FIGS. 7-9 are flow diagrams of respective methodologies for processing transmissions associated with a given HARQ process.
Figure 8:
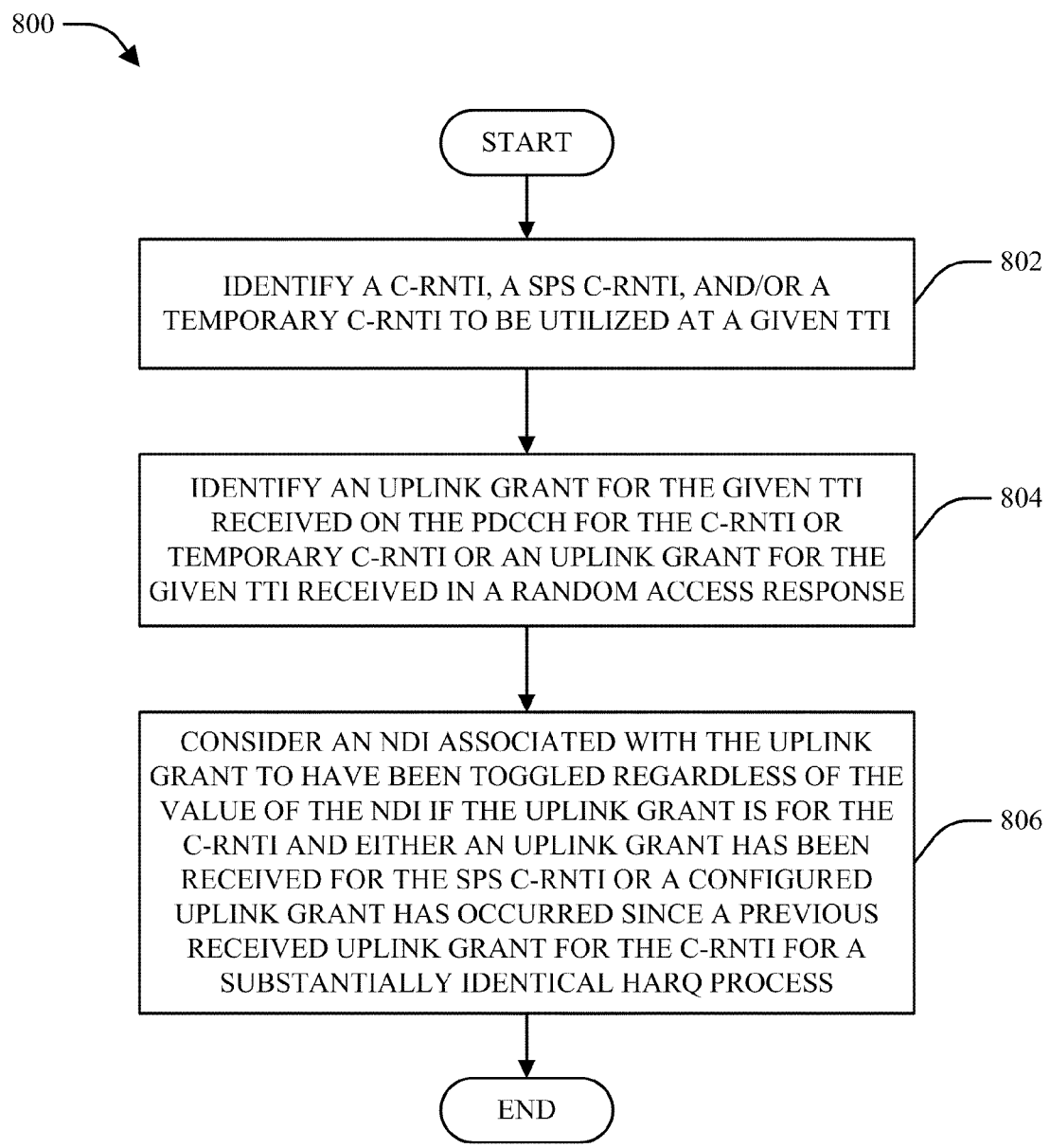
Figure 9:
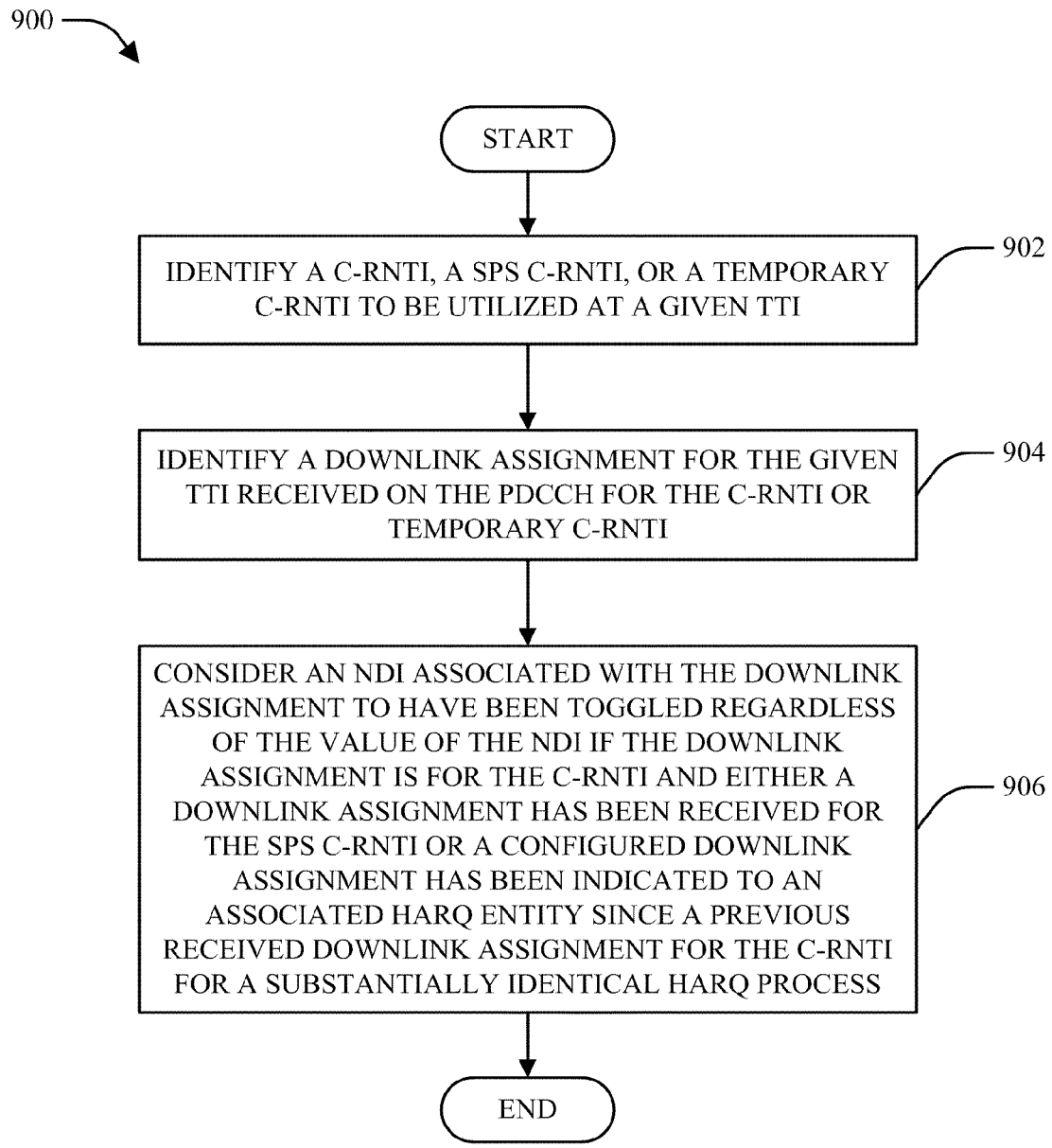

Referring now to FIGS. 7-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for processing respective transmissions associated with a given HARQ process. It is to be appreciated that methodology 700 can be performed by, for example, a terminal or user device (e.g., UE 120) and/or any other appropriate network device. It should also be appreciated that methodology 700 can be performed with respect to any suitable number of HARQ processes (e.g., a single HARQ process or multiple HARQ processes on a per-HARQ process basis). In accordance with one aspect, methodology 700 begins at block 702, wherein scheduling information, an initial NDI, and/or other information relating to an initial transmission (e.g., an uplink grant, downlink assignment, or the like from a base station 110) for a HARQ process are identified. Similarly, at block 704, scheduling information, a subsequent NDI, and/or other information relating to a subsequent transmission for the HARQ process are identified. In one example, scheduling information identified at block 702 and/or block 704 can relate to semi-persistent scheduling, dynamic scheduling, and/or any other suitable scheduling scheme utilized for the respective transmissions. Further, scheduling information as identified at blocks 702 and/or 704 can be provided relative to one or more associated RNTIs, such as, for example, a C-RNTI, a SPS C-RNTI, a temporary C-RNTI, or the like.

Upon completing the acts described at blocks 702 and 704, methodology 700 can conclude as shown in block 706, wherein the subsequent NDI identified at block 706 is processed as toggled from the initial NDI identified at block 702 (e.g., by a NDI handler 126) irrespective of a value of the subsequent NDI upon determining that the scheduling information changed between the initial transmission as identified at block 702 and the subsequent transmission as identified at block 704. In one example, a positive determination can be reached at block 706 to trigger processing of the subsequent NDI in the event that SPS is utilized for the initial transmission as identified at block 702 and dynamic scheduling is utilized for the subsequent transmission as identified at block 704. Similarly, in the event that a relationship exists between scheduling and respective RNTIs, a positive determination can be reached at block 706 in the event that the initial transmission utilizes a SPS C-RNTI and the subsequent transmission utilizes a C-RNTI associated with dynamic scheduling. In another example, as a result of processing the subsequent NDI as toggled, an entity performing methodology 700 can process the subsequent transmission as a transmission of new data regardless of the value of the subsequent NDI.

Turning now to FIG. 8, a flow diagram of a methodology 800 for processing respective UL grant transmissions associated with a given HARQ process is illustrated. Methodology 800 can be performed by a UE and/or any other appropriate network entity. Methodology 800 begins at block 802, wherein a C-RNTI, a SPS C-RNTI, and/or a temporary C-RNTI to be utilized at a given TTI are identified. Next, at block 804, an UL grant for the given TTI is identified, which is received on the PDCCH for the C-RNTI or temporary C-RNTI or which is received in a Random Access Response. Methodology 800 can then conclude at block 806, wherein an NDI associated with the UL grant is considered to have been toggled (e.g., by a NDI handler 126 and/or a grant processing module 414) regardless of the value of the NDI if the UL grant is for the C-RNTI and either an UL grant has been received for the SPS C-RNTI or a configured UL grant has occurred since a previous received UL grant for the C-RNTI for a substantially identical HARQ process (e.g., as determined by a grant history analyzer 412).

FIG. 9 illustrates a methodology 900 for processing respective DL assignment transmissions associated with a given HARQ process. Methodology 900 can be performed by, for example, a mobile terminal and/or any other suitable network entity. Methodology 900 begins at block 902, wherein a C-RNTI, a SPS C-RNTI, and/or a temporary C-RNTI to be utilized at a given TTI are identified. Next, at block 904, a DL assignment for the given TTI received on the PDCCH for the C-RNTI or temporary C-RNTI is identified. Methodology 900 can then conclude at block 906, wherein an NDI associated with the DL assignment is considered to have been toggled (e.g., by a NDI handler 126 and/or an assignment processing module 514) regardless of the value of the NDI if the DL assignment is for the C-RNTI and either a DL assignment has been received for the SPS C-RNTI or a configured DL assignment has been indicated to an associated HARQ entity since a previous received DL assignment for the C-RNTI for a substantially identical HARQ process (e.g., as determined by an assignment history analyzer 512).

Figure 10:
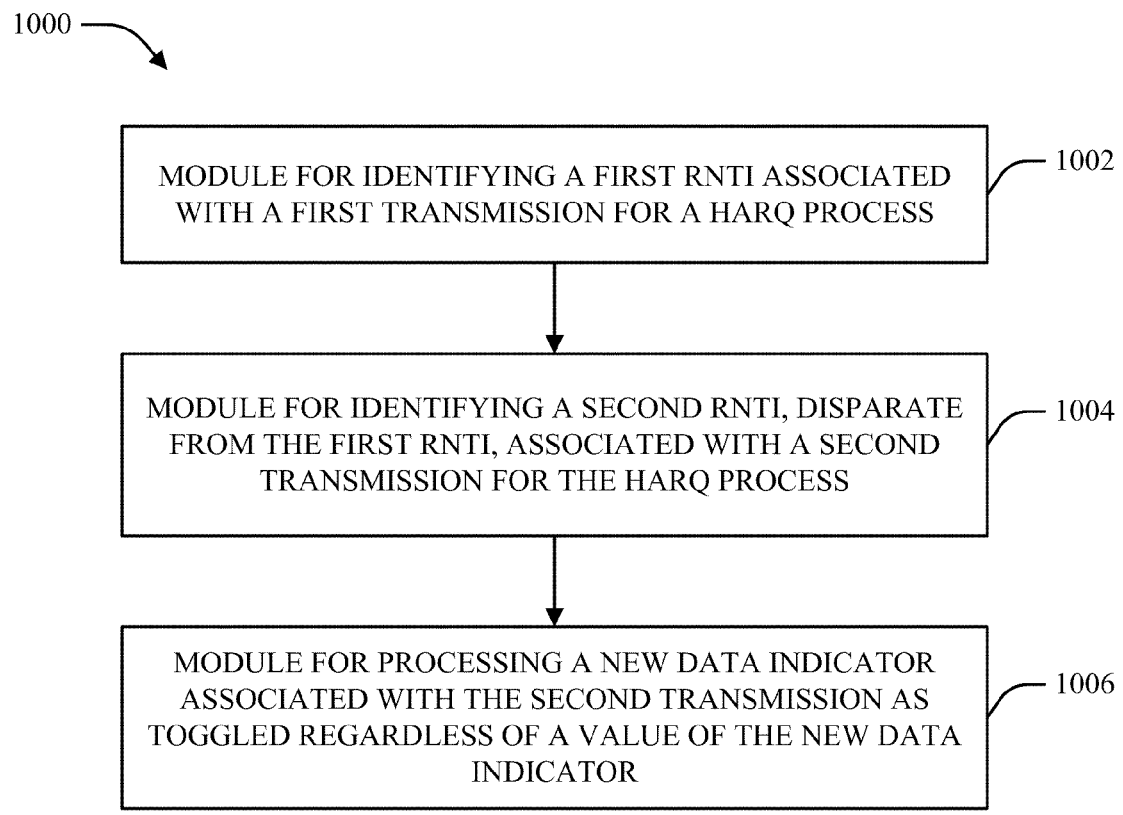
FIG. 10 is a block diagram of an apparatus for managing a new data indicator associated with respective transmissions in a wireless communication system.

Referring next to FIG. 10, illustrated is an apparatus 1000 that facilitates managing a new data indicator associated with respective transmissions in a wireless communication system. It is to be appreciated that apparatus 1000 is represented as including functional blocks, which can be functional blocks that represent functions implemented by a processor, software, or combination thereof (e.g., firmware). Apparatus 1000 can be implemented by a UE (e.g., UE 120) and/or another suitable network entity and can include a module 1002 for identifying a first RNTI associated with a first transmission for a HARQ process, a module 1004 for identifying a second RNTI, disparate from the first RNTI, associated with a second transmission for the HARQ process, and a module 1006 for processing a new data indicator associated with the second transmission as toggled regardless of a value of the new data indicator.

Figure 11:
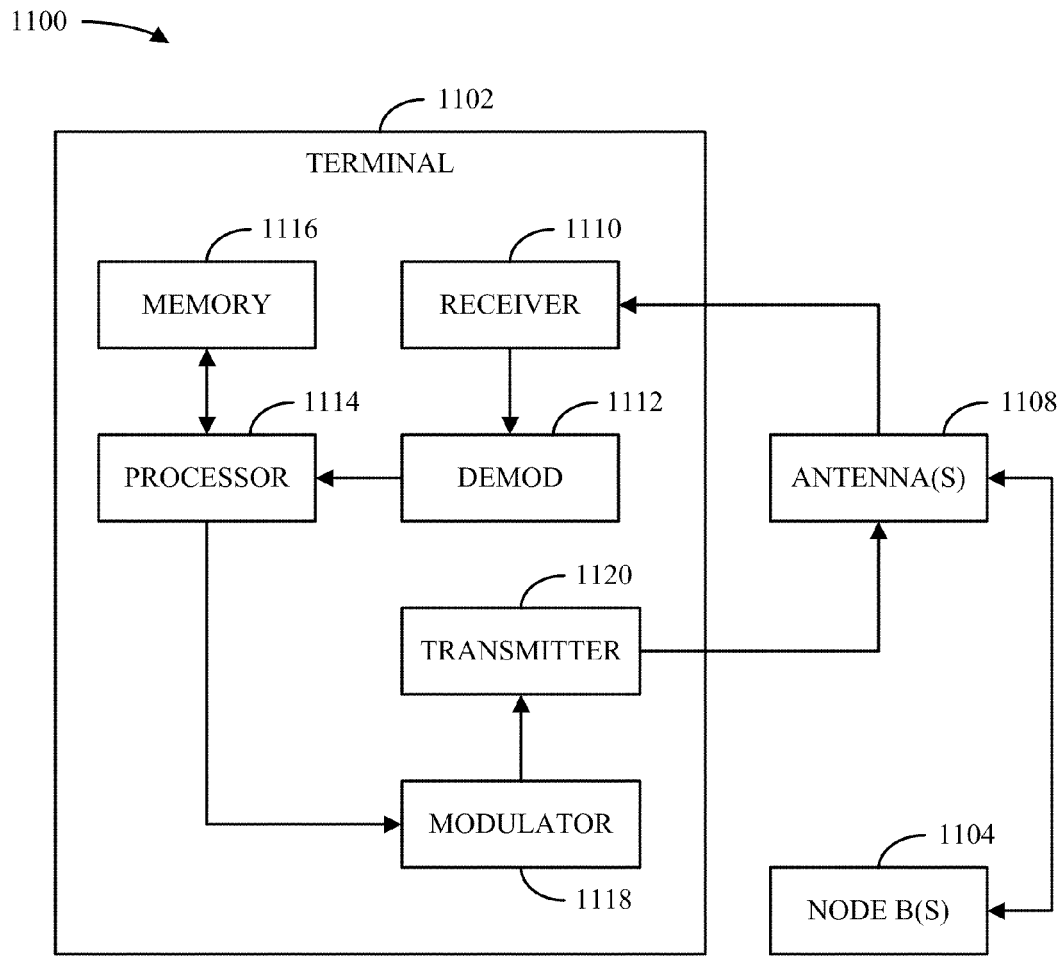
FIG. 11 is a block diagram of a wireless communication device that can be utilized to implement various aspects described herein.

FIG. 11 is a block diagram of a system 1100 that can be utilized to implement various aspects of the functionality described herein. In one example, system 1100 includes a terminal 1102. As illustrated, terminal 1102 can receive signal(s) from one or more Node Bs 1104 and transmit to the one or more Node Bs 1104 via one or more antennas 1108. Additionally, terminal 1102 can comprise a receiver 1110 that receives information from antenna(s) 1108. In one example, receiver 1111 can be operatively associated with a demodulator (Demod) 1112 that demodulates received information. Demodulated symbols can then be analyzed by a processor 1114. Processor 1114 can be coupled to memory 1116, which can store data and/or program codes related to terminal 1102. Additionally, terminal 1102 can employ processor 1114 to perform methodologies 700-900 and/or other similar and appropriate methodologies. Terminal 1102 can also include a modulator 1118 that can multiplex a signal for transmission by a transmitter 1120 through antenna(s) 1108.

Figure 12:
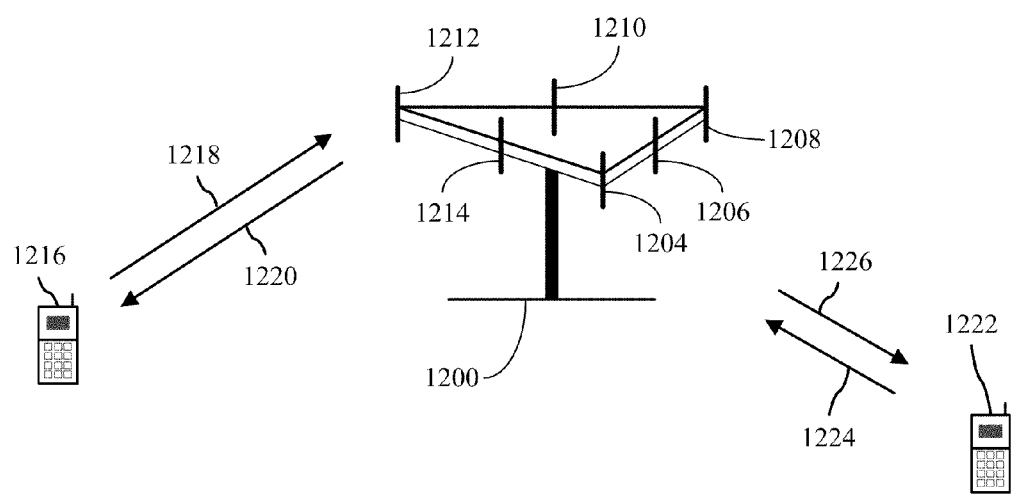
FIG. 12 illustrates a wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1212 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
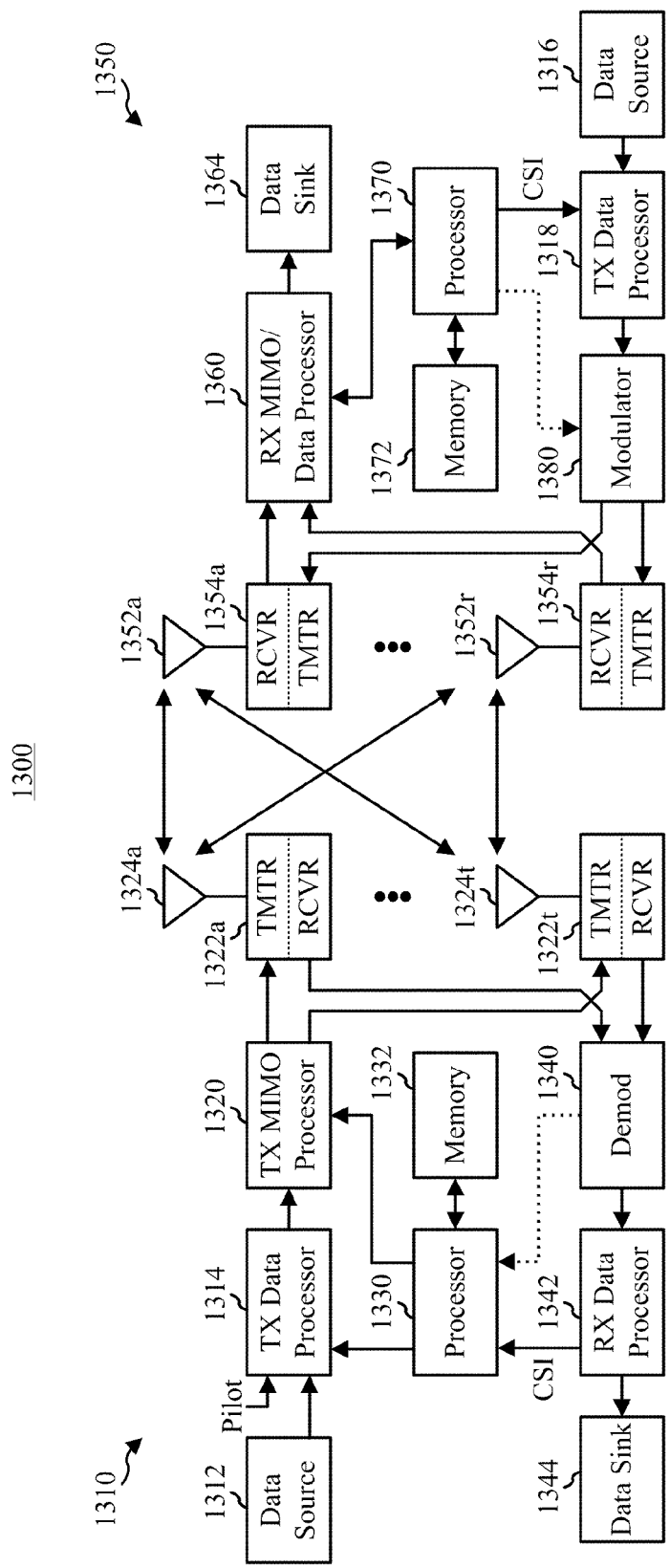
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1316 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying information relating to an initial transmission for a Hybrid Automatic Repeat Request (HARQ) process, the information comprising scheduling information and an initial new data indicator (NDI);
    identifying information relating to a subsequent transmission for the HARQ process, the information comprising scheduling information and a subsequent NDI; and
    bypassing NDI processing upon determining that the scheduling information comprises semi-persistent scheduling (SPS) retransmission.

2. The method of claim 1, wherein:
    the identifying information relating to an initial transmission comprises determining whether dynamic scheduling is utilized for the initial transmission; and
    the identifying information relating to a subsequent transmission comprises determining whether SPS is utilized for the subsequent transmission.

3. The method of claim 1, wherein:
    the identifying information relating to an initial transmission comprises determining a scheduling technique utilized for the initial transmission based on a radio network temporary identifier (RNTI) associated with the initial transmission; and
    the identifying information relating to a subsequent transmission comprises determining a scheduling technique utilized for the subsequent transmission based on a RNTI associated with the subsequent transmission.

4. The method of claim 1, wherein at least one of the initial transmission or the subsequent transmission comprises an uplink grant transmission.

5. The method of claim 1, wherein at least one of the initial transmission or the subsequent transmission comprises a downlink assignment transmission.

6. The method of claim 1, wherein the identifying information relating to an initial transmission and the identifying information relating to a subsequent transmission are performed for multiple HARQ processes on a per-HARQ process basis.

7. A wireless communications apparatus, comprising:
    a memory that stores data relating to a Hybrid Automatic Repeat Request (HARQ) process, a first transmission and a second transmission for the HARQ process, and a new data indicator (NDI); and
    a processor configured to identify a scheduling format utilized for the first transmission and the second transmission for the HARQ process and to bypass NDI processing upon determining that the scheduling format comprises a semi-persistent scheduling (SPS) retransmission.

8. The wireless communications apparatus of claim 7, wherein the scheduling format utilized for the first transmission comprises dynamic scheduling and the scheduling format utilized for the second transmission comprises SPS.

9. The wireless communications apparatus of claim 7, wherein the processor is further configured to identify a scheduling format utilized for the first transmission and the second transmission for the HARQ process based at least in part on radio network temporary identifiers (RNTIs) respectively associated with the first transmission and the second transmission.

10. The wireless communications apparatus of claim 7, wherein at least one of the first transmission or the second transmission comprises uplink grant information.

11. The wireless communications apparatus of claim 10, wherein the processor is further configured to receive an uplink grant for a given transmission time interval (TTI) on a Physical Downlink Control Channel (PDCCH) associated with a cell RNTI (C-RNTI) or a temporary C-RNTI of the wireless communications apparatus and to consider the NDI to have been toggled regardless of the value of the NDI upon determining that the uplink grant is for the C-RNTI of the wireless communications apparatus and that either an uplink grant has previously been received for a SPS C-RNTI of the wireless communications apparatus or a configured uplink grant has occurred since a previous received uplink grant for the C-RNTI of the wireless communications apparatus in association with the HARQ process.

12. The wireless communications apparatus of claim 7, wherein at least one of the first transmission or the second transmission comprises downlink assignment information.

13. The wireless communications apparatus of claim 12, wherein the processor is further configured to receive a downlink assignment for a given transmission time interval (TTI) on a Physical Downlink Control Channel (PDCCH) associated with a cell RNTI (C-RNTI) or a temporary C-RNTI of the wireless communications apparatus and to consider the NDI to have been toggled regardless of the value of the NDI upon determining that the downlink assignment is for the C-RNTI of the wireless communications apparatus and that either a downlink assignment has previously been received for a SPS C-RNTI of the wireless communications apparatus or a configured uplink grant has been indicated to a HARQ entity associated with the wireless communications apparatus since a previous received downlink assignment for the C-RNTI of the wireless communications apparatus in association with the HARQ process.

14. The wireless communications apparatus of claim 7, wherein the processor is further configured to manage respective transmissions associated with a plurality of distinct HARQ processes on a per-HARQ process basis.

15. A computer program product, comprising:
a non-transitory computer-readable medium, comprising:
code for causing a computer to identify a first radio network temporary identifier (RNTI) used for a first transmission associated with a Hybrid Automatic Repeat Request (HARQ) process;
code for causing a computer to identify a second RNTI, disparate from the first RNTI, used for a second transmission associated with the HARQ process that occurs subsequent to the first transmission; and
code for causing a computer to bypass NDI processing for the second transmission upon determining that semi-persistent scheduling (SPS) is used for the first transmission and the second transmission is an SPS retransmission.

16. The computer program product of claim 15, wherein:
the code for causing a computer to identify a first RNTI comprises code for causing a computer to identify a RNTI associated with a scheduling technique used for the first transmission, wherein the scheduling technique is selected from the group consisting of semi-persistent scheduling (SPS) and dynamic scheduling; and
the code for causing a computer to identify a second RNTI comprises code for causing a computer to identify a RNTI associated with a scheduling technique used for the second transmission, wherein the scheduling technique is selected from the group consisting of SPS and dynamic scheduling.

17. The computer program product of claim 16, wherein the computer-readable medium further comprises code for causing a computer to process the second transmission associated with the HARQ process as a new transmission.

18. The computer program product of claim 15, wherein at least one of the first transmission or the second transmission comprises an uplink grant.

19. The computer program product of claim 18, wherein:
the code for causing a computer to identify a first RNTI comprises code for causing a computer to identify a cell RNTI (C-RNTI) or a temporary C-RNTI for which an uplink grant provided with the first transmission is received; and
the code for causing a computer to identify a second RNTI comprises code for causing a computer to identify a SPS C-RNTI on which an uplink grant provided with the second transmission is received.

20. The computer program product of claim 15, wherein at least one of the first transmission or the second transmission comprises a downlink assignment.

21. The computer program product of claim 20, wherein:
the code for causing a computer to identify a first RNTI comprises code for causing a computer to identify a cell RNTI (C-RNTI) or a temporary C-RNTI for which a downlink assignment provided with the first transmission is received; and
the code for causing a computer to identify a second RNTI comprises code for causing a computer to identify a SPS C-RNTI on which a downlink assignment provided with the second transmission is received.

22. The computer program product of claim 15, wherein the code for causing a computer to identify a first RNTI and the code for causing a computer to identify a second RNTI are operable for multiple HARQ processes on a per-HARQ process basis.

\* \* \* \* \*